July 10, 1962 T. HINDLE ET AL 3,043,153
FELT AND LIKE GUIDES
Filed Jan. 20, 1959 5 Sheets-Sheet 1
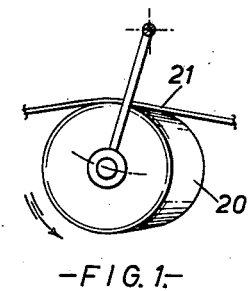
—FIG. 1.—
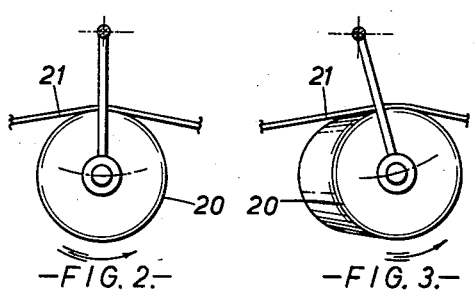
—FIG. 2.— —FIG. 3.—
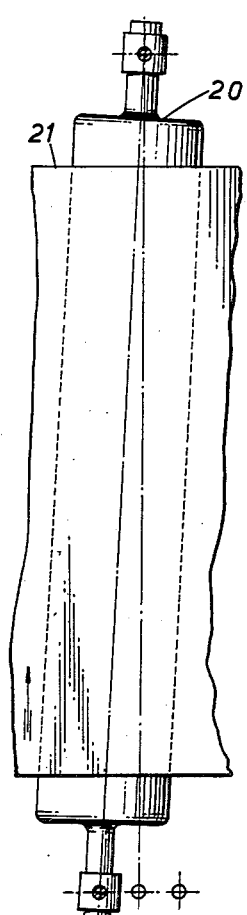
—FIG. 4.—
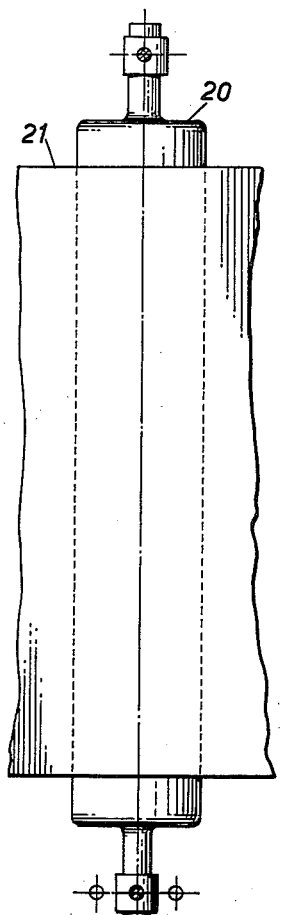
—FIG. 5.—
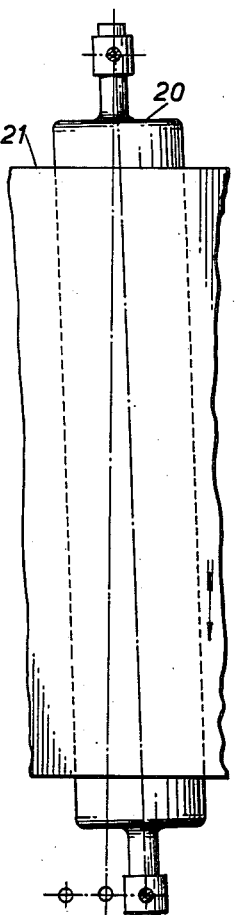
—FIG. 6.—
INVENTORS
Thomas Hindle
David Dugmore Banks
BY
Roberts Cushman & Grassi
ATTORNEY July 10, 1962
T. HINDLE ET AL
3,043,153
FELT AND LIKE GUIDES
Filed Jan. 20, 1959
5 Sheets-Sheet 2
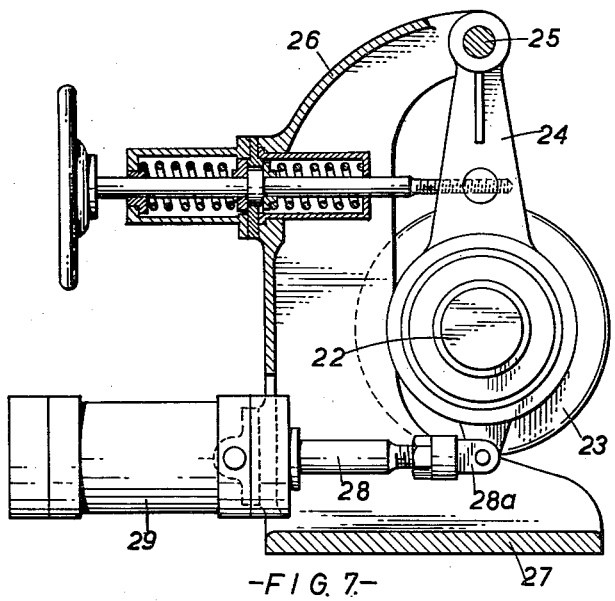
-FIG. 7.-
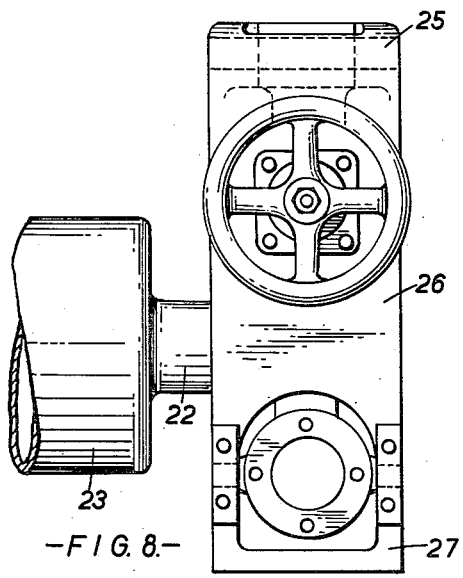
-FIG. 8.-
INVENTORS
Thomas Hindle
David Dugmore Banks
BY
Roberts Cushman & Grover
ATTORNEY July 10, 1962  T. HINDLE ET AL  3,043,153
FELT AND LIKE GUIDES
Filed Jan. 20, 1959  5 Sheets-Sheet 3
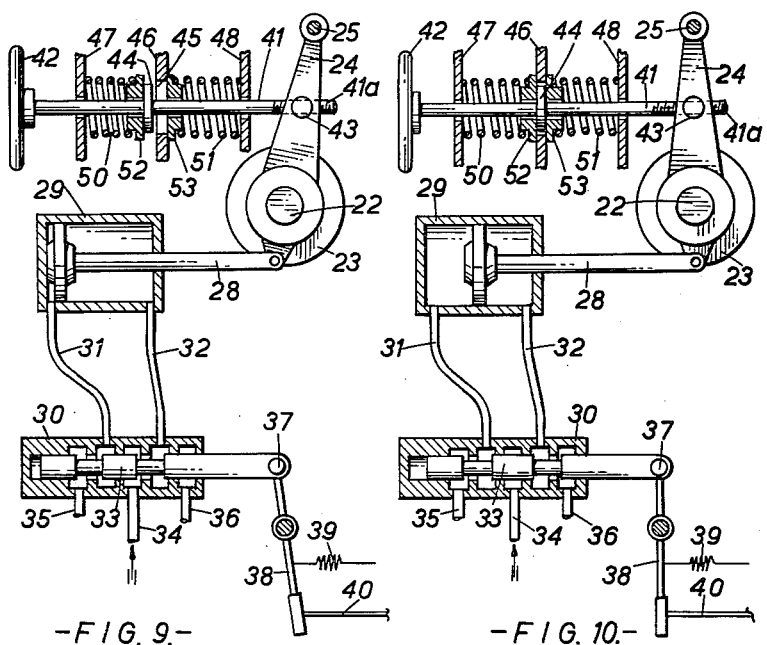
-FIG. 9.-  -FIG. 10.-
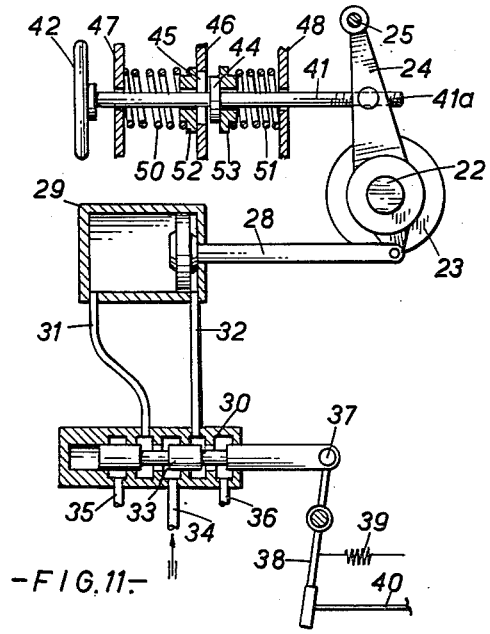
-FIG. 11.-
INVENTORS
*Thomas Hindle*
*David Dugmore Banks*
BY
*Roberts Cushman & Grant*
ATTORNEY July 10, 1962 T. HINDLE ET AL 3,043,153
FELT AND LIKE GUIDES
Filed Jan. 20, 1959 5 Sheets-Sheet 4
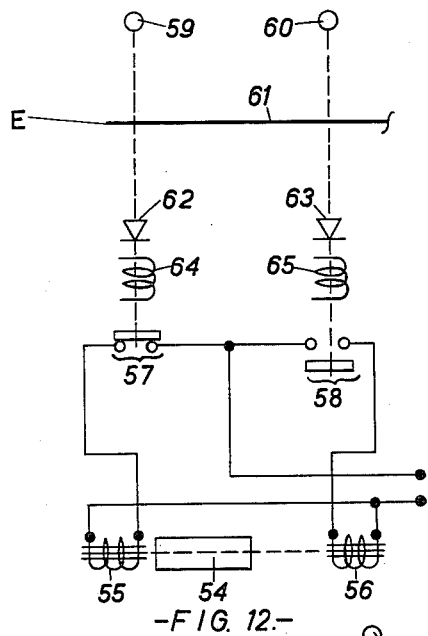
-FIG. 12.-
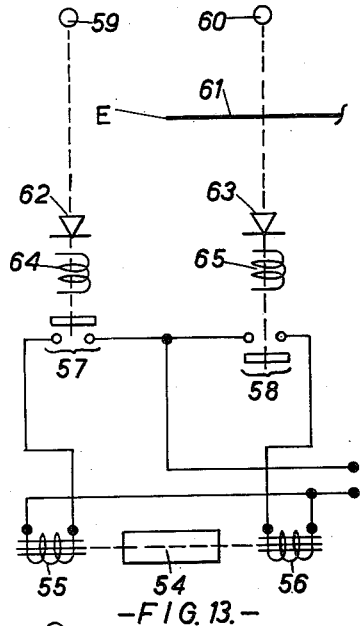
-FIG. 13.-
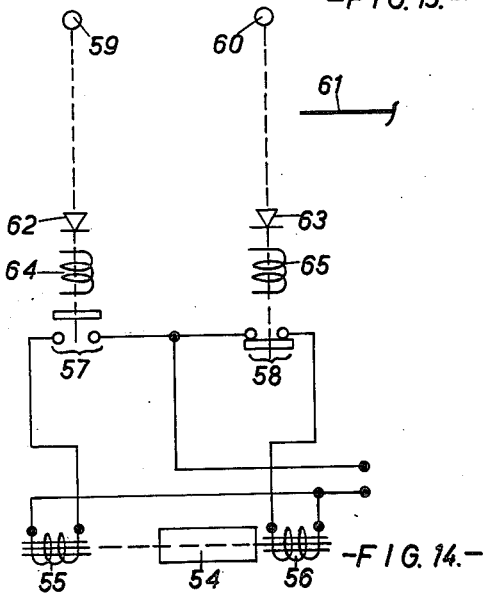
-FIG. 14.-
INVENTORS
Thomas Hindle
David Dugmore Banks
BY
Roberts Cushman & Grover
ATTORNEY July 10, 1962 T. HINDLE ET AL 3,043,153
FELT AND LIKE GUIDES
Filed Jan. 20, 1959 5 Sheets-Sheet 5
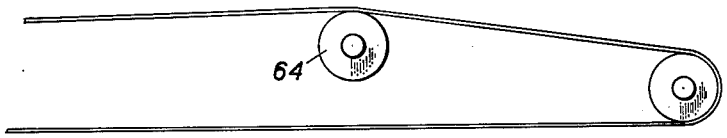
—FIG. 15.—
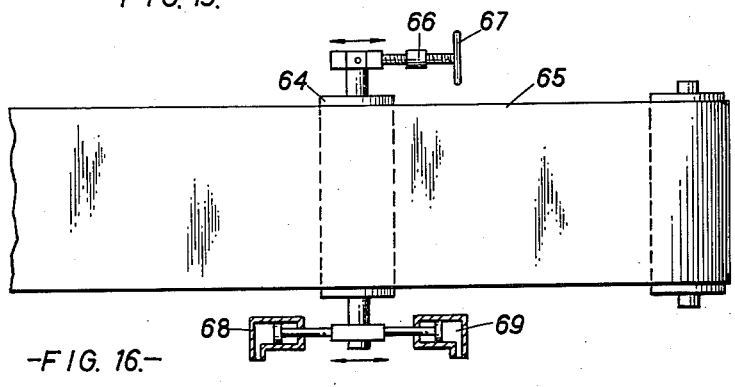
—FIG. 16.—
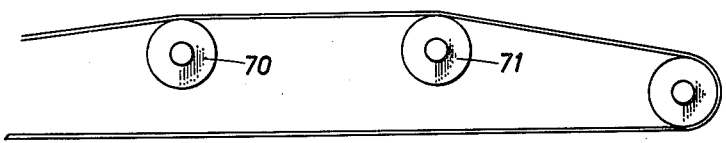
—FIG. 17.—
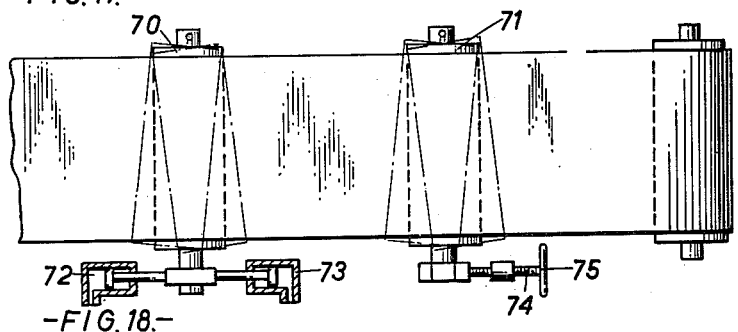
—FIG. 18.—
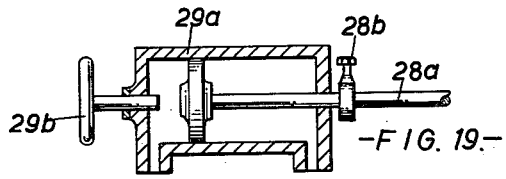
—FIG. 19.—
INVENTORS
Thomas Hindle
David Dugmore Banks
BY
Roberts Cushman & Grover
ATTORNEY United States Patent Office 3,043,153
Patented July 10, 1962

3,043,153
FELT AND LIKE GUIDES
Thomas Hindle, Blackburn, and David Dugmore Banks, Feniscowles, near Blackburn, England, assignors to Scapa Dryers Limited, Blackburn, England, a British company
Filed Jan. 20, 1959, Ser. No. 787,953
Claims priority, application Great Britain Jan. 21, 1958
26 Claims. (Cl. 74—241)

This invention relates to felt and like guides, such as wire guides, and is particularly, though not exclusively, applicable to guides for the felt or wire of paper-making machines. The expression "band guide" is used hereinafter generically to include the aforementioned guides.

Fundamentally, such band guides consist of a guide roller over which the band passes in contact with a relatively small arc of the roller and which roller is adjustable for its axial inclination to one side or the other from a transverse position normal (i.e. at right angles) to the run of the said band, so as thereby to correct a deviation of the same from a predetermined normal running position on its rollers.

A band guide must act quickly to correct a deviation, especially with the increase of lineal speeds of bands used in modern machinery. Also, any controlling feeler must be very sensitive to avoid damage to the edge of the band, and must be fully responsive to some of the modern papermakers' felts which are relatively soft at their edges compared with felts of earlier days. Sensitivity is also important in connection with a wire guide to reduce to a minimum wear of the edge of the wire by the feeler. The expression "feeler" is used herein to include not only a feeler in sensible contact with the edge of the band, but also a light beam system or other device operably associated with the edge of the band.

According to the invention, a band guide comprising a guide roller, feeler means responsive to at least one edge of the band and sensitive to a deviation thereof from a predetermined normal running position, and power-actuated means responsive to said feeler means for changing the inclination of the axis of the guide roller relative to the run of the band is characterised in that the said power-actuated means comprises means for inclining the guide roller to a predetermined inclination to either side from a pre-set normal position, and further means for pre-setting the normal running position of the band.

In the accompanying drawings:
FIGS. 1, 2 and 3 are diagrammatic end elevations; and
FIGS. 4, 5 and 6 are complementary plan views of an adjustable guide roller for a belt showing the known principles of operations of such a roller;
FIGS. 7 and 8 are an end elevation and front elevation respectively of the adjustable end of a guide roller made in accordance with one embodiment of the present invention;
FIGS. 9, 10 and 11 are fragmentary diagrammatic elevations, partly in vertical section, showing, in three different positions, respectively, valve actuating mechanism for the apparatus of FIGS. 7 and 8;
FIGS. 12, 13 and 14 are wiring diagrams showing electrical means for actuating the valve mechanism of FIGS. 9, 10 and 11;
FIGS. 15 and 16 are a diagrammatic elevation and plan, respectively, of a modified embodiment of the invention;
FIGS. 17 and 18 are a diagrammatic elevation and plan, respectively, of another embodiment of the invention;
FIG. 19 is a fragmentary vertical section showing a modified construction of pneumatic operating cylinder.

As shown in FIGS. 1 to 6, a guide roller 20 is located transversely across the run of a travelling belt 21, such as a papermakers' dryer felt, the roller being so positioned, as can be seen from FIGS. 1, 2 and 3 that the path of the belt is slightly deflected to give a small angle of contact with the roller. The roller is mounted at one end (the upper end in FIGS. 4, 5 and 6) in a conventional bearing, for example, such as the bearing 16 disclosed in the United States patent to Saebe, 2,853,295, September 23, 1958 for pivotal movement whilst the other end is adapted to be moved to one side or the other of a normal central position at right-angles to the run of the belt. When the roller is in the central position (FIG. 2) and the line of contact of the periphery of the roller with the belt is at right angles to the normal direction of travel of the belt, it has no lateral action on the belt, but when moved to one side or the other, the inclination of the roller applies a lateral thrust to the belt which is used to centralise the latter, the direction of thrust relative to the direction of movement of the belt being shown by the arrows in FIGS. 4 and 6.

As shown in FIGS. 7 to 11, the laterally movable end of the axle 22 of the guide roller 23 is pivotally suspended by a link or lever 24 at 25 from a bracket 26 adapted to be secured by a base 27 to a frame member (not shown) of the dryer section of a papermaking machine. At its lower end, the link 24 is connected to the outer end of a piston rod 28 of a pneumatic motor, comprising the cylinder 29, by an adjustable end extension 28a, the ends of the cylinder being connected (see FIGS. 9 to 11) to a valve box 30 by ducts 31 and 32. Slidably mounted in the valve box is a valve bobbin 33 controlling a central pressure supply 34 and release passenges 35, 36. The outer end of the valve bobbin is pivotally connected at 37 to a feeler lever 38 which is urged by a spring 39 to contact one edge of the belt 40.

The adjustment for setting the roller axle to an approximate running position as here illustrated comprises a rod 41 having, at its outer end, a hand wheel 42 and being screw threaded at its other end 41a for engagement with a swivel nut 43 carried by the link 24. Near the center of the rod is a collar 44, fixed to the rod and adapted to pass through an aperture 45 in a central partition 46. On each side of the partition 46 is a further partition 47, and 48, respectively, and between such partitions and around the rod are centralizing springs 50 and 51 carrying collars 52 and 53 on their inner ends complementary to the collar 44 aforesaid on the rod, but of larger diameter than the collar 44. These collars 52 and 53 can slide freely on the rod 41.

In use, with the felt running slowly, the hand wheel 42 may be adjusted for an approximate correct central running position. Thereafter, the feeler 38 will be operative so that deviation of the felt 40 will move the bobbin valve to admit fluid pressure to one end or the other of the cylinder 29 of the fluid pressure motor. Thereby, the axle 22 of the roller 23 is swung momentarily one way or the other, to alternative positions shown in FIGS. 9 and 11, the collar 44 operating to compress one of the springs 50 or 51 while the other is held back by the central partition 46. As soon as the deviation has been corrected, the feeler will return to a normal position, shutting off the pressure supply and allowing both ends of the motor cylinder to be open to atmosphere through the release passages 35, 36 so that the springs 50 and 51 can centralize the rod to the positions shown in FIG. 10 and thereby return the roller to the previously adjusted normal running position aforesaid.

By careful setting of the hand wheel 42 and feeler

38, "hunting" of the belt guide device can be reduced to a minimum. Obviously, to relieve the operation of exerting muscular force for moving the rod 41, a manually controlled servomotor, wholly independent of the detector means, might be provided for moving the rod 41 or its equivalent.

As shown in FIGS. 12, 13 and 14, electronic means may be provided in lieu of the feeler 38. Such electronic means, shown diagrammatically, comprises an armature 54 positioned between solenoids 55 and 56 in an electric circuit including alternatively acting solenoid operated electric switches 57 and 58 adapted to be actuated by photo-electric circuits including two sources of light 59, 60 positioned adjacent to one edge E of the belt 61, and complementary photo-electric cells 62 and 63, respectively, controlling the solenoids 64 and 65.

In operation, when the belt is running in a normal centralized position as shown in FIG. 13 neither of the switches 57 or 58 is closed. If, however, the edge E of the belt moves across to the position shown in FIG. 12, the interruption of light to the photo-electric cell 62 results in closing the switch 57 so as thereby to move the armature 54 to the left. Although not here shown, it is assumed that armature 54 is connected to a pivoted lever corresponding to the feeler lever 38 so that, therefore, the controlling bobbin valve of the motor means will be moved to the left to the position shown in FIG. 11 and the roller moved accordingly. As shown in FIG. 14, the uncovering of the photo-electric cell 63 causes closing of the switch 58 and movement of the parts in the other direction.

As shown in FIGS. 15 and 16, the guide roller 64 for the band 65 is adjustable at one end by means of a screw 66 and hand wheel 67, whilst at the other end, power-actuated means shown as cylinder units 68 and 69 are provided as described with reference to the earlier figures of the drawings.

As shown in FIGS. 17 and 18, there are two guide rollers 70 and 71 respectively of which the guide roller 70 is power-actuated at one end by cylinder units shown diagrammatically at 72 and 73 as described with reference to the earlier FIGS. 1 to 14 hereof. The further guide roller 71 is adjustable by means of a screw 74 and hand wheel 75.

In either of the two forms just above described the normal running position of the band can be pre-set by means of the hand wheel 67 or 75 respectively whilst the automatic guiding actuation is obtained from the power-actuated cylinder units as described with reference to the earlier FIGS. 1 to 14 of the drawings.

As shown in FIG. 19, the operating cylinder 29a is provided with an adjustable stop screw 29b whilst the piston rod 28a is provided with an adjustable stop collar 28b. These stops 29b and 28b may be set so as to limit the angular displacement whereby the momentary power-induced angularity of the guide roller may be adjusted to an effective value so that the guiding correction for the band will be quickly applied without over correction. The setting of these stops can be effected during the running of the belt, as to some extent such settings will vary with each band according to its tendency to run out of normal alignment.

The improved guide has the advantage that failure of fluid operating pressure will not immediately throw the device out of action with risk to damage to the felt. Compared with some guide means, there are fewer parts as guide bars and linkage have been eliminated from the construction. Also, of course, the feeler, since it operates by remote control using pneumatic, hydraulic or other power such as electric solenoids, can be positioned in the most effective position, and not necessarily immediately adjacent the guide roller. The feeler can be light and sensitive since it only has to actuate a light valve or electric contacts and this type of guide is, therefore, specially suitable for operating with very "light" felts.

The invention is obviously not limited to all the constructional details above described, insofar as they may be varied without departing from the scope of the invention. For example, the centralizing means can be designed quite differently, yet being capable of performing the same function and any suitable valve other than a bobbin valve could be used to control the operating pressure fluid. As already suggested above, electrical means instead of fluid pressure can be used to swing the links. The pre-set return of the guide roller can be effected other than by return springs.

Again, owing to the high sensitivity of a photo-electric circuit, if the tolerance of setting is too small, chattering of the switches 57 and 58 backwards and forwards can be set up, from small tolerable irregularities of the edge of the felt or unwanted actuation can be caused by a piece of loose material thereon, or even by the clipper seam wire. To avoid such chattering or unwanted activation of the magnets and to take full advantage of the sensitivity of an electronic control for the switches 57 and 58, a conventionally electronic delay (not shown) may be included by way of a modification in the electric circuit, giving a delay of, say, ½ second.

We claim:

1. A detector-controlled, band-realigning guide of the kind wherein a band-adjusting roll extends transversely across a band and in contact with the latter, and wherein the opposite ends of the roll turn in bearings, the bearing at one end, at least, of the roll comprising means defining an axis about which the roll may be swung, the other bearing being movable, manually adjustable means for so moving the movable bearing as to dispose the axis of the roll in a pre-set normal angular position relatively to the length of the band, power drive means operative to shift the movable bearing thereby momentarily to displace the axis of the roll to either side from its pre-set angular position, spring means, independent of the power-driven means, operative automatically to restore said movable bearing to its initial position, after displacement in either direction, as soon as the power drive means is idle so as immediately to return the roll axis to the pre-set position, and detector means, responsive to motion of the edge of the band longitudinally of the roll, to activate and deactivate the power drive means.

2. A detector-controlled band-realigning guide according to claim 1, wherein the movable bearing is mounted on a support which is movable longitudinally of the band in a vertical plane substantially parallel to the edge of the band, and wherein the means for pre-setting the axis of the roll comprises a rotatable and axially movable shaft, said shaft having screw-threaded connection with the bearing support, means whereby the shaft may be rotated thereby to move it longitudinally relatively to the bearing support, a spring-compressing collar fixed to the shaft, intermediate the ends of the latter, opposed compression springs having their proximate ends opposed to said collar, fixed abutment means for said proximate ends of the springs operative to keep them spaced apart a distance at least equal to the thickness of said collar thereby to hold said collar in a predetermined position such as to define a pre-set position for the axis of the roll determinable by rotation of said shaft.

3. A band-realigning guide according to claim 2, wherein the rotatable and longitudinally movable shaft turns in aligned bearing openings in two spaced fixed members and the fixed abutment means comprises a partition midway between said members, said partition having an aperture through which the collar on the shaft may pass, and the spring means comprising two coiled compression springs coaxial with the shaft, each spring bearing, at its outer end, against a fixed part and having at its opposite, movable end a collar of a diameter such that it cannot pass through the aperture in said partition.

4. A band guide according to claim 1, and wherein the movable bearing is mounted on a support which is movable longitudinally of the band in a vertical plane substantially parallel to the edge of the band, said support being a link which is pivotally suspended to swing about an axis perpendicular to the length of the band, the manually adjustable means for pre-setting the axis of the roll being connected to said link intermediate the ends of the latter and the power drive means being operatively connected to said link adjacent to the free end of the latter.

5. A band-realigning guide of the kind wherein a band-adjusting guide roll extends transversely across the path of travel of a moving band, and wherein the opposite ends of the guide roll are mounted to turn in bearings, a stationary support for one of said bearings, the latter bearing comprising means defining a fixed axis about which the roll may be swung, a movable support for the other bearing which is adjustable longitudinally of the band so as thereby to vary the angular position of the axis of the roll relatively to the length of the band and thus cause the edge of the band to change its position, said movable support being so adjustable as to allow the axis of the roll to be disposed in a definite selected pre-set position such that the edge of the band is thereby caused to assume a desired normal operating position, relatively quick acting automatic motor means comprising a movable element, which, upon actuation of the motor means, moves in one or another of opposite directions, means for transmitting motion from said movable motor element to the movable bearing support whereby, upon actuation of the motor means, the bearing support is quickly and momentarily shifted from said pre-set position according to the direction in which the edge of the band may have deviated from its normal operating position, said movable motor element being free to move in either direction when the motor means is deactivated so that, when the motor means is deactivated, it permits rapid free return movement of said bearing support at any time to said selected pre-set position, spring means resiliently tending to maintain said bearing support in any selected pre-set position to which it may be adjusted, and independently actuable means operable so to pre-set the movable bearing support as to occupy a definite selected pre-set normal operating position, but without disturbing the normal functioning of said spring means.

6. A band-realigning guide of the kind wherein a band-adjusting guide roll extends transversely across the path of travel of a moving band, and wherein the opposite ends of the guide roll are mounted to turn in bearings, a stationary support for one of said bearings, the latter bearing comprising means defining a fixed axis about which the roll may be swung, a movable support for the other bearing which is adjustable longitudinally of the band, so as thereby to vary the angular position of the axis of the roll relatively to the length of the band and thus cause the edge of the band to change its position, said movable support being so adjustable as to allow the axis of the roll to be disposed in a definite selected pre-set position such that the edge of the band is thereby caused to assume a desired normal operating position, spring means tending to return the movable support to said selected pre-set position, if removed therefrom, a reversible motor comprising a movable element and which is automatically activated in response to deviation of the band-edge from normal operating position, momentarily to shift the support for the movable bearing and thereby move the axis of the roll away from its selected pre-set position to a correcting position in a direction such as to cause the deviated band-edge to move back to normal operating position, motor control means, comprising a detector device to activate the motor, in response to the deviation of the band-edge from the selected pre-set normal operating position and to deactivate said motor when deviation of the band-edge is no longer effective to cause correcting response of the detector device, said movable element of the motor, which, at times, is operative to shift the bearing support, being free to move in either direction when the motor means is deactivated whereby the bearing support is free to be returned by the spring means to said normal operating position as soon as the motor is deactivated, and manual means, wholly independent of the motor, for adjusting the movable support to a new pre-set normal operating position.

7. A band-realigning guide according to claim 6, the support for the movable bearing support being a lever which swings in a plane parallel to the edge of the band and in a plane substantially perpendicular to the surface of the latter, and motion-transmitting means for transmitting motion from said movable part of the motor thereby to swing said lever.

8. A band-realigning guide according to claim 7, wherein the manual means for adjusting the support for the movable bearing to pre-set position, the motion-transmitting means and the spring means which tends to restore the movable bearing support to normal pre-set position, are all operatively connected to the same lever.

9. A band-realigning guide according to claim 6, comprising adjustable, positive means for limiting motion of the movable motor element in either direction.

10. A band-realigning guide according to claim 6, wherein the detector means comprises a photoelectric cell and a lamp for illuminating the cell, said cell and illuminating means being located at opposite faces of the band, and so arranged, relatively to the edge of the band, that motion of said edge of the band from normal operating position, by occluding the light from the lamp, causes a change in the current of the photoelectric cell, and the reversible motor comprising a solenoid in circuit with the photoelectric cell, which, in response to a change of current in the photoelectric cell, momentarily shifts the movable bearing support.

11. A band-realigning guide of the kind wherein a band-adjusting guide roll extends transversely across the path of travel of a moving band, and wherein the opposite ends of the guide roll are mounted to turn in bearings, an immovable support for one of said bearings, said latter bearing comprising means defining a fixed axis about which the roll may be swung, and the other bearing being carried by a support which is movable in a plane which is parallel to the adjacent edge of the band, and substantially perpendicular to the surface of the band, motor means comprising an element which moves in one or another of opposite directions when the motor means is activated, means for transmitting motion from said movable motor element to the movable bearing support thereby to move the latter to a correcting position, and manually-actuatable means, wholly independent of said motor means, for adjusting said movable bearing support to a selected pre-set position such that the edge of the band assumes a normal definite predetermined operating position wherein the line of contact between the band and the periphery of the roll intersects the edge of the band at a predetermined angle, and detector means, responsive to the shift of an edge of the band, lengthwise of the roll, from normal operating position, for momentarily activating the motor means to move the support into said correcting position, the movable motor element being free to move in either direction when the motor is deactivated, whereby the movable bearing is free to return to its selected pre-set position, and spring means, wholly independent of the motor means, constantly tending to restore said movable bearing support to its pre-set normal position.

12. A band guide according to claim 11, wherein the independent means for presetting the movable bearing support longitudinally of the edge of the band, thereby to adjust the line of contact between the band and the roll to a normal operating position, comprises an elongate, longitudinally movable rod, and the means tending to restore said movable support to its pre-set position, after each operation of the motor, comprises coiled springs coaxial with said elongate rod.

13. A band guide according to claim 11, wherein the means for pre-setting the movable bearing support comprises an axially movable rotatable shaft, provided at one end with means for turning it, and having a screw-threaded portion which engages a nut carried by said movable bearing support, an abutment element fixed to said shaft intermediate its ends, and resiliently yieldable means engaging said abutment, and which tends constantly to retain said movable bearing support in pre-set normal operating position.

14. A band guide according to claim 11, wherein the means for restoring the motor-adjusted bearing support to its selected pre-set position, after having been displaced therefrom by the action of the motor, comprises two opposed compression springs, and fixed abutment means interposed between the proximate ends of said springs operative to limit expansion of each, respectively, of said springs, thereby to insure restoration of the bearing support to said pre-set position.

15. A band guide according to claim 11, and wherein the reversible motor is a pneumatic motor provided with a control valve, the means for pre-setting the movable support thereby to adjust the angular position of the line of contact between the band and roll to a normal operating position, comprising an elongate, rotatable shaft having a hand wheel at one end and having a screw-threaded portion which engages a nut carried by the movable bearing support, the shaft having a collar affixed thereto, intermediate its ends, and a pair of coaxial compression springs mounted upon said shaft, each spring having a collar, larger than the collar on the shaft, fixed to its inner end, fixed abutment means for the outer ends of said springs respectively, and a fixed partition midway between said abutments, having an aperture through which the collar on the shaft may pass freely, but which is of a diameter less than the diameter of the collars carried by the springs thereby to limit motion of the proximate ends of said springs and so insure restoration of the movable bearing support to the selected pre-set position.

16. In a detector-controlled, band-realigning mechanism of the kind wherein a band-adjusting roll is mounted at each end in bearings, one of which is so movable as to vary the angular relation of the axis of the roll to the edge of the band, in combination, means for shifting the position of said movable bearing comprising a fluid pressure motor, a sensing device responsive to lateral displacement of the band edge from the proper operating position and, by such response, activating the motor to shift the movable bearing, in one direction to the other, from a pre-set position, thereby to restore the band-edge to its proper operating position, and means, including a fixed abutment, operative, in the event of failure of pressure fluid supply, to retain the movable bearing in its then position or to restore it to said preset position if moved therefrom.

17. In a detector-controlled, band-realigning mechanism of the kind wherein a band-guiding roller is mounted at each end in bearings, one of which is so movable as to vary the angular relation of the axis of the roller to the edge of the band, in combination, means, including a fixed abutment, operative to define a selected pre-set position of said movable bearing, and means for restoring said movable bearing to said pre-set position when removed therefrom, said restoring means comprising a fluid pressure motor, a sensing device responsive to lateral displacement of the band-edge from proper operating position and, by such response, actuating a valve for admitting pressure fluid to the motor and thereby promptly effecting full possible displacement of the movable bearing, temporarily, in one direction or the other, from its pre-set position, thereby quickly to restore the band-edge to its proper operating position, said restoring means also comprising constantly-acting, normally stressed spring means which is further stressed by the displacement of the movable bearing from its pre-set position, the sensing means being operative, in response to return of the band-edge to proper operating position, so to move the motor valve as to exhaust the fluid pressure from the motor thereby permitting the spring means automatically and quickly to restore the movable bearing to its pre-set position as defined by said abutment.

18. Band-realigning mechanism according to claim 17, comprising manually-actuatable means for adjusting the movable bearing to such selected pre-set position as best suits the characteristics of the band in use thereby reducing the frequency of corrective action.

19. Band-realigning mechanism according to claim 17, wherein the fluid pressure motor comprises a cylinder having therein a double-ended piston and the control valve is operative to admit pressure fluid to act upon one end or the other of the piston in accordance with the direction in which the sensing element is moved, by displacement of the band-edge, from its proper operating position, and is likewise operative to exhaust pressure fluid from the cylinder in response to the return of the sensing element to normal position, thereby permitting the instant return of the movable bearing to pre-set position.

20. In a detector-controlled, band-realigning mechanism of the kind wherein a band-guiding roller is mounted at each end in a bearing, one of said bearings being movable so as to vary the angular relation of the axis of the roller to the edge of the band, spring means, and a fixed abutment normally cooperating to hold said movable bearing in a selected pre-set position, a detector device which is sensitively responsive to the departure of the band-edge from normal operating position, a motor device which, under control of said detector device, is energized in response to departure of the band-edge from its normal position and thereby promptly effects full available but temporary displacement of the movable bearing, in one direction or the other, from its selected pre-set position such as to restore the band-edge to normal position while concomitantly so stressing the spring means as to provide force for returning the bearing to pre-set position—the detector device being operative, in response to return of the band-edge to normal position, so to affect the motor device as to permit the stressed spring means, in cooperation with said fixed abutment, to return the movable bearing to the selected pre-set position.

21. In a detector-controlled, band-realigning mechanism according to claim 20, and wherein the spring means comprises two opposed, normally compressed, coiled compression springs having a movable, motor-actuated, spring-compressing element interposed between their proximate ends, the fixed abutment being interposed between the opposed movable ends of the springs whereby the motion of the movable end of each respective spring, toward the movable end of the other spring, is positively limited.

22. Detector-controlled, band-realigning mechanism according to claim 21, further characterized in having manually-actuatable means for adjusting said movable bearing to a selected pre-set position, and wherein the springs are operative to prevent change in the position of said movable, motor-actuated, spring-compressing element in response to the operation of said manually-actuatable means.

23. In a detector-controlled, band-realigning mechanism of the kind wherein a band-guiding roller is mounted at each end in a bearing, one of said bearings being movable so as to vary the angular relation of the axis of the roller to the edge of the band, means, including a pair of opposed compression springs and a fixed abutment interposed between their adjacent ends, for defining a selected pre-set position of the movable bearing, detector means which is sensitively responsive to the departure of the band-edge from normal operating position, and a pressure fluid motor for shifting the movable bearing from its selected pre-set position, said motor comprising a cylinder having therein a double-ended piston with provision for admitting pressure fluid to either end, alternatively, of the cylinder while releasing it from the opposite end, means for transmitting motion from the piston to the movable bearing, and valve means for determining the admission of fluid to the motor cylinder or its release therefrom, said valve means being controlled by the detector device, said springs being operative whenever pressure fluid is absent from the motor cylinder, forcibly to return the movable bearing to its pre-set position.

24. Mechanism according to claim 23 wherein the valve for controlling the operation of the motor device is a piston-valve slidable in a cylinder, means for so transmitting motion from the detector device to said valve that when the band-edge is in normal operative position, the valve is so located as to cut-off the supply of pressure fluid to the motor cylinder and so that both ends of the motor cylinder are open to the air, while the springs, in cooperation with said fixed abutment, return the movable bearing to its pre-set position, the parts being so arranged that response of the detector device to departure of the band-edge from normal position moves the valve toward one end or the other of its cylinder and thus admits pressure fluid to the corresponding end of the motor cylinder, thereby, at once, effecting the full available displacement of the movable bearing together with the guide roller which it supports, until the band-edge has been returned to its correct operating position.

25. A band-realigning guide according to claim 20, wherein the motor device is a solenoid comprising two independent coils, the solenoid having a movable core and means for transmitting motion from the core to the movable bearing, detector means comprising two photoelectric cells both spaced from the same edge of the band, one cell being further from said edge than the other and both cells being above the band, and two corresponding light sources below the band, a magnetically-actuated switch in the circuit of each, respectively, of said solenoid coils, said switches being controlled by the respective photoelectric cells, the cells and the switch circuits being so relatively arranged that when the band-edge is in normal operative position, the nearer of the two light beams is interrupted by the band while the more remote light beam is uninterrupted and both switches are open and the movable bearing is retained in its pre-set position by the spring means, the switch circuits being such that, if the edge of the band moves to one side so as to interrupt both light beams, or if it moves in the other direction so that neither light beam is interrupted, one or the other of the switches is closed thereby energizing the corresponding solenoid coil to move the core of the solenoid at such a direction as temporarily to displace the movable bearing from pre-set position until the band-edge has been restored to its normal operating position.

26. In a detector controlled, band-realigning mechanism of the kind wherein a band-guiding roll is mounted at each end in a bearing, one of said bearings being movable so as to vary the angular relation of the axis of the roller to the edge of the band, means, including a pair of opposed compression springs and a fixed abutment interposed between the adjacent ends of said springs, for defining a selected pre-set position of the movable bearing, the bearing at one end, at least, of the roll comprising means defining a fixed axis about which the roll may be swung, the other bearing being movable in a direction generally parallel to the edge of the band, manually actuable means for so moving the movable bearing as to dispose the axis of the roll in a definite pre-set normal angular position relatively to the length of the band, power drive means including a movable member operative, on activation, momentarily to displace the axis of the roll to either side of a normal deactivated position, said compression springs and fixed abutment cooperating upon deactivation of said power drive means automatically to restore said movable member to its normal deactivated position, adjusting means connecting said movable member to the movable bearing whereby adjustably to determine a pre-set position of the movable bearing complementary to said normal deactivated position of the movable member, and detector means responsive to the motion of the edge of the band, longitudinally of the roll, to activate and deactivate the power drive means.

References Cited in the file of this patent

UNITED STATES PATENTS

| | | |
|---|---|---|
| 1,992,649 | Brunk | Feb. 26, 1935 |
| 2,530,122 | Hornbostel | Nov. 14, 1950 |
| 2,654,599 | Frisbie et al. | Oct. 6, 1953 |
| 2,666,598 | Robinette | Jan. 19, 1954 |
| 2,709,588 | Staege | May 31, 1955 |
| 2,729,112 | Wendshuh et al. | Jan. 3, 1956 |
| 2,786,675 | Montefalco et al. | Mar. 26, 1957 |
| 2,853,295 | Sabee | Sept. 23, 1958 |